United States Patent Office 3,530,091
Patented Sept. 22, 1970

3,530,091
LIGHT AND HEAT STABILIZED SYNTHETIC POLYMERS
Atsushi Kitaoka, Nobeoka, Shinichi Ishida and Kunio Sato, Tokyo, Isamu Suzuki and Jukichi Ohmura, Fuji, and Keisuke Murayama, Syoji Morimura, Saburo Akagi, Tomoyuki Kurumada, and Ichiro Watanabe, Tokyo, Japan, assignors to Sankyo Company Limited, Tokyo, and Asahi Kasei Kogyo Kabushiki Kaisha, Osaka, Japan
No Drawing. Filed Oct. 31, 1967, Ser. No. 679,515
Claims priority, application Japan, Nov. 12, 1966, 41/74,309; Apr. 15, 1967, 42/23,969; Apr. 17, 1967, 42/24,344
Int. Cl. C08f 45/58; C08g 51/58
U.S. Cl. 260—45.85                                 4 Claims

ABSTRACT OF THE DISCLOSURE

Resinous polymers particularly polyolefins, polyurethanes and polyacetals are stabilized against photo-deterioration by incorporating therein at least one compound selected from the bis-phenol formate derivatives in a sufficient amount to prevent such deterioration.

---

This invention relates to the stabilization of resinous polymers. More particularly, it relates to the stabilization of resinous polymers against the photo-deterioration by incorporating therein an effective amount of the bis-phenol formate derivatives having the Formula 1

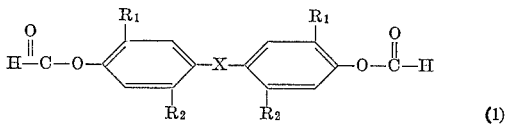

(1)

wherein $R_1$ and $R_2$ may be the same or different and represent hydrogen, alkyl or alkoxy group, and X represents oxygen atom, sulfur atom, the group of the formula

wherein $R_3$ and $R_4$ may be the same or different and represent hydrogen atom or alkyl group, or they may form a 5-, 6-, or 7-membered saturated homocyclic ring, or the group of the formula

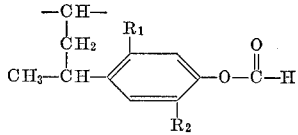

wherein $R_1$ and $R_2$ are as defined above.

This invention also relates to the resinous polymers thus stabilized.

The term "resinous polymer" herein used means to include polyolefins such as high or low pressure polyethylene, polypropylene, polybutadiene, polyisoprene, polystyrene and the like; olefin copolymers such as ethylene-propylene copolymers, styrene-butadiene copolymers, acrylonitrile - butadiene - styrene copolymers; polyurethanes; polyacetals, copolyacetals; and the like, and these resinous polymers may be of any shape or form, for example, including filament, fiber, film, sheet, other shaped article, latex, foam and the like.

The resinous polymers frequently tend to undergo photo-deterioration when exposed outdoors or indoors to light such as sunlight or ultraviolet light. There have been heretofore proposed various types of stabilizers for the protection of these resinous polymers against such photo-deterioration. For instance, a great number of light stabilizers have been suggested in the art for purpose of stabilizing the resinous polymers, for example, polyolefins, polyurethanes and polyacetals, against such photo-deterioration. Especially, there are favourably recommended such light stabilizers as "Tinuvin P" (the trade name of the light stabilizer comprising as an active ingredient 2-(2'-hydroxy-5'-methylphenyl)-benzotriazole), "Cyasorb UV–531" (the trade name of the light stabilizer comprising as an active ingredient 2-hydroxy-4-n-octoxy-benzophenone) and "Santo White Powder" (S.W.P.) (the trade name of the light stabilizer comprising as an active ingredient 1,1 - bis(2 - methyl - 4 - hydroxy-5-tert.-butylphenyl)-n-butane). These light stabilizers have been conveniently utilized in the art, but development of practically more favourable light stabilizer would be imperatively needed in the art.

As a result of our extensive investigation on light stabilizers, it has been unexpectedly found that the above-specified bis-phenol formate derivatives of the Formula 1 exhibit an exceptionally high degree of stabilizing action on the resinous polymers against photo-deterioration thereof and also that they show little thermal sublimation and appreciable discoloration on the resinous polymers. Furthermore, it has been unexpectedly found that, when the above-specified bis-phenol formate derivatives of the Formula 1 are used as stabilizer for polyacetal, they exhibit an exceptionally high degree of stabilizing action against oxidation as well as against photo-deterioration.

It is, therefore, a primary object of this invention to provide a novel class of light stabilizers for the resinous polymers against photo-deterioration.

Another object is to provide the resinous polymers stabilized against photo-deterioration by incorporating therein an effective amount of the bis-phenol formate of the Formula 1.

Still another object of this invention is to provide a method for the stabilization of the resinous polymer against photo-deterioration which comprises incorporating in the said polymer an effective amount of the bis-phenol formate derivatives of the Formula 1.

Other objects of this invention will be obvious from the contents of the specification hereinafter disclosed.

The bis-phenol formate derivatives of the above Formula 1 are novel compounds unknown in the prior art, and representative examples of the bis-phenol formate derivatives which may be employed in this invention include the following: 2,2'-dimethyl-4,4'-diformyloxy-5,5'-di-tert.-butyldiphenyl sulfide; 2,2'-di-tert.-butyl-4,4'-diformyloxy-5,5'-dimethoxydiphenylmethane; 1,1 - bis(2-methyl-4-formyloxy-5-tert.-butylphenyl) butane; 2,2-bis(4-formyloxyphenyl) propane; 1,1,3-tris (2-methyl-4-formyloxy-5-tert.-butylphenyl) butane; 1,1-bis (3-methyl-4-formyloxyphenyl) cyclohexane; 4,4'-diformyloxydiphenyl ether; 2,2'-bis (2 - methyl - 4 - formyloxy - 5 - tert.-butylphenyl) ethane; and 2,2'-bis (2-ethyl-4-formyloxy-5-tert.-butylphenyl) ethane.

For the purpose of illustrating the preparation of the bis-phenol formate derivatives (1) as explained above, one representative embodiment of the preparation of such formate derivatives is given below, this disclosure being incorporated herein solely as a reference.

PREPARATION

Preparation of 2,2'-dimethyl-4,4'-diformyloxy-5,5'-di-tert.-butyldiphenyl sulfide To 100 ml. of dimethyl formamide there was added dropwise 50 g. of phosphorus oxychloride under ice-cooling with stirring and the reaction mixture thus obtained was held with stirring at room temperature for 1 hour. Then to the resulting reaction mixture was added 30 g.

of 2,2'-dimethyl-4,4'-dihydroxy-5,5'-di-tert.-butyldiphenyl sulfide, and the reaction mixture thus obtained was gradually heated to 100–105° C. and stirred for 24 hours. Thereafter, the resulting reaction mixture was poured onto cracked-ice, neutralized with sodium carbonate and extracted with benzene. The extract was washed with aqueous sodium bicarbonate and water, and then dried over anhydrous sodium sulfate. On distilling off benzene and recrystallizing the residue from ethanol, there was obtained the desired product having a melting point of 90 to 91° C.

Analysis.—Calculated for $C_{24}H_{30}O_4S$ (percent): C, 69.54; H, 7.30. Found (percent): C, 69.66; H, 7.37.

Infrared spectral measurements (in Nujol):

1756 cm.$^{-1}$($\nu$c.=0—ester)
1170 cm.$^{-1}$($\nu$c.=0—formate)

Where the bis-phenol formate derivatives of the above Formula 1 are to be employed in the resinous polymer for the purpose of stabilization, they may be readily incorporated into the resinous polymer by various conventional procedures utilized in the art. The stabilizers in this invention may be incorporated into the resinous polymer at any desired stage prior to the manufacture of shaped articles. For example, the dry stabilizer in a form of powder may be admixed with the resinous polymer, or a suspension or emulsion of the stabilizer of this invention may be admixed with a suspension or emulsion of the resinous polymer.

The amount of the bis-phenol formate derivatives to be employed in the resinous polymer in accordance with this invention may be widely varied, depending upon the types, properties and particular uses of the resinous polymer and other factors. For instance, the bis-phenol formate derivatives of the Formula 1 is generally added in an amount of between about 0.01 and 10 percent by weight of the resinous polymer, but the preferable range is varied depending upon the types of the resinous polymer, for example, about 0.01 to 2% by weight for polyolefins, and 0.1 to 5% by weight for polyacetals.

The bis-phenol formate derivatives (1) of this invention may be optionally and advantageously employed alone or in combination with other additives, such as other known stabilizers (including, for example, antioxidants and ultraviolet absorbants), fillers, pigments and the like. If necessary, an optional combination of two or more bis-phenol formate derivatives (1) may be satisfactorily employed in this invention to obtain the better results.

The following examples are given solely for the purpose of illustrating the excellent light stability of the bis-phenol formate derivatives (1) in the resinous polymer in accordance with this invention. In these examples, all parts are given by weight unless otherwise stated.

EXAMPLE 1

In a mortar, with 100 parts of polypropylene was intimately admixed 0.25 part of the bis-phenol formate derivatives of this invention specified in the following Table I.

The resulting mixture was preheated to 215° C. under pressure of 10 kg./cm.$^2$ for 2 minutes and then compression-molded into a sheet of 0.5 mm. thick at 215° C. under a pressure of 150 kg./cm.$^2$ for 0.5 minute.

As a control for comparative purpose, the polypropylene sheets were prepared by repeating the same procedure as described above except that the commercially available stabilizer shown in the following Table I was employed instead of the stabilizer of this invention or any kind of stabilizers was not used.

Thereafter, all of these sheets thus prepared were tested for the "brittleness time" (which term means the time, expressed in terms of hours, until the test sheet becomes brittle) under ultraviolet irradiation at 45° C. by means of the Fade-Ometer prescribed in the JIS–L–1004–3–8 (wherein JIS is abbreviated name of Japanese Industrial Standard).

The test results are summarized in the following Table I.

TABLE I

| Stabilizer: | Brittleness time (hour) |
|---|---|
| Bis-phenol formate derivatives of this invention: | |
| (a) 2,2'-dimethyl-4,4'-diformyloxy-5,5'-di-tert.-butyldiphenyl sulfide | 200 |
| (b) 1,1-bis(2-methyl-4-formyloxy-5-tert.-butylphenyl)butane | 180 |
| (c) 1,1,3-tris(2-methyl-4-formyloxy-5-tert.-butylphenyl)methane | 300 |
| Commercially available stabilizer: | |
| (d) 2,2'-dimethyl-4,4'-dihydroxy-5,5'-di-tert.-butyldiphenyl sulfide | 80 |
| (e) 1,1-bis(2-methyl-4-hydroxy-5-tert.-butylphenyl)butane | 60 |
| None | 40 |

EXAMPLE 2

The sheets were prepared by repeating the same procedure as described in Example 1 except that 100 parts of ethylene-propylene block copolymer (which contains 13 mol percent of ethylene component) and 0.20 part of stabilizers shown in the following Table II were employed instead of 100 parts of propylene and 0.25 part of stabilizers shown in the above Table I.

Thereafter, all of these sheets were tested in the same method as in Example 1.

The test results are summarized in the following Table

TABLE II

| Stabilizer: | Brittleness time (hour) |
|---|---|
| Bis-phenol formate derivatives of this invention: | |
| (a) 2,2'-dimethyl-4,4'-diformyloxy-5,5'-di-tert.-butyldiphenyl sulfide | 280 |
| (b) 1,1-bis(2-methyl-4-formyloxy-5-tert.-butylphenyl)butane | 200 |
| Commercially available stabilizer: | |
| (c) 2,2'-dimethyl-4,4'-dihydroxy-5,5'-di-tert.-butyldiphenyl sulfide | 120 |
| (d) 1,1-bis(2-methyl-4-hydroxy-5-tert.-butylphenyl)butane | 100 |
| None | 60 |

EXAMPLE 3

200 g. of low molecular weight polymer having terminal hydroxy groups (prepared by reaction of 2 moles of poly-$\epsilon$-caprolactone diol having a molecular weight of 1000 with 1 mole of 2,4-tolylenediisocyanate) was subjected to polymerization reaction with 46 g. of methylene bis(4-phenyl isocyanate) at 90° C. for 1 hour to produce a prepolymer.

The prepolymer thus obtained was dissolved in 740 g. of dimethylformamide at room temperature. Then, to the resulting solution was added additional portion (50 g.) of dimethylformamide containing 1.7 g. of water. After adequately stirring, there obtained a viscous solution, which was then divided into 5 portions of each approximately equal amount. The first and second portions of the solution were intimately admixed with 1% by weight, based on the polymer, of the bis-phenol formate derivatives of this invention specified in the following Table III. As a control for comparative purpose, the third and forth portions of the solution were intimately admixtured with the known stabilizers specified in the following Table III in the same amount as above. The last one portion remained unmodified without addition of such stabilizer.

Each portion thus obtained was spun into a yarn of 280 denier by a conventional wet spinning process in water-bath at 40° C.

The yarn produced by the above process was then tested for its light stability as set forth below. The test procedure was employed which involved exposure of the yarn to ultraviolet irradiation at 55° C., for 25 hours by means of the Fade-Ometer prescribed in the JIS–4–1044–1959. The tensile strength and elongation of the yarn before and after exposure to ultraviolet irradiation were measured by means of a standard fiber tensile tester, "Tensilon" (trade name for a portable fiber or film tensile tester). The ultimate tensile strength loss and elongation loss were determined by subtraction of the values after exposure from those before exposure, respectively. The color which might develop after ultraviolet irradiation was visually observed and recorded on each yarn.

The results are summarized in the following Table III.

TABLE III

| Stabilizer | Ultimate tensile strength loss, percent | Ultimate elongation loss, percent | Color |
|---|---|---|---|
| Bis-phenol formate drivatives of this invention: | | | |
| (a) 1,1,3-tris (2-methyl-4-formyloxy-5-tert,-butylphenyl) butane | 5 | 8 | Unchanged. |
| (b) 1,1-bis (2-methyl-4-formyloxy-5-tert.-butylphenyl) butzne | 10 | 9 | Do. |
| Commercially available stabilizer: | | | |
| (c) 1,1,3-tris (2-methyl-4-hydroxy-5-tert,-butylphenyl) butane | 40 | 41 | Yellow-colored. |
| (d) 1,1-bis (2-methyl-4-hydroxy-5-tert.-butylphenyl) butane | 45 | 42 | Do. |
| None | 85 | 81 | Brown-colored. |

EXAMPLE 4

100 g. of low molecular weight polymer having terminal hydroxy groups [prepared by reaction of 3 moles of poly(tetramethylene-oxide)glycol having a molecular weight of 1000 with 2 moles of 2,4-tolylene diisocyanate] was subject to polymerization reaction with 16.8 g. of methylene bis (4-phenyl isocyanate) at 95° C. for 1 hour to produce a prepolymer.

The prepolymer thus obtained together with 13.9 g. of methylene bis (4-phenyl isocyanate) were dissolved in 1 l. of methylene chloride. Then, 300 ml. of methylene chloride containing 0.54 g. of ethylenediamine was added to the resulting solution with stirring to precipitate a polymer. To the resulting reaction mixture was added 3 l. of methanol and methylene chloride was distilled off. The polymer thus obtained was washed with methanol and dried.

Then, the polymer thus obtained was divided into 5 portions of each approximately equal amount. The first and second portions were intimately admixed with 1% by weight, based on the polymer, of the bis-phenol formate derivatives of this invention specified in the following Table IV. As a control for comparative purpose, the third and fourth portions were intimately admixed with the known stabilizers specified in the following Table IV in the same amount as above. The last one portion remained unmodified without addition of such stabilizer.

Then, each portion was compression-molded into a thin sheet at 200° C. under a pressure of 20 kg./cm.$^2$, and the sheets thus obtained were subjected to test for its light stability by repeating the same procedure as described in Example 3 except that the ultraviolet ray was irradiated for 35 hours instead of for 25 hours.

The results are summarized in the following Table IV.

It is apparent from the above results that the bis-phenol formate derivatives of this invention exhibit high retentions of tensile strength and of elongation and further, they are effective in the prevention of discoloration in the resinous polymer after exposure to light.

EXAMPLE 5

Polyoxymethylene diacetate having a reduced viscosity of 2.21 was admixed with 1% by weight, based on the said polymer, of copolyamide (which consists of terpolymer of 35% caprolactam, 35% hexamethylene adipate and 30% hexamethylene sebacate) and 0.2% by weight, based on the said polymer, of the bis-phenol formate derivatives of the invention specified in the following Table V.

The above composition containing the copolyamide and stabilizer was extruded into strands and cut into pellets which, in turn, was injection-molded into test bars.

As a control for comparative purpose, other test bars were prepared by repeating the same procedure as described above except that commercially available stabilizers shown in the following Table V were employed instead of the stabilizers of the invention shown in the following Table V.

The test bars thus obtained were then tested as follows.

The light stability, the weight-retention, the retention of reduced viscosity, the color and the thermal stability were measured or observed as set forth below.

(i) Light stability.—The test bar was exposed to ultraviolet irradiation at 45° C. for 40 hours by means of the Fade-Ometer prescribed in the JIS–L–1044–3–8. The color after the above ultraviolet irradiation was visually observed and recorded on each test bar.

(ii) Weight-retention (thermal stability) (W.R.).— The test bar was heated at 220° C. for 30 minutes in an atmosphere. The weight of the test bar was measured before and after the heat treatment as described above. The weight-retention was calculated as follows:

$$W.R.(\%) = \frac{\text{The weight of the test bar after heat treatment}}{\text{The weight of the test bar before heat treatment}} \times 100$$

(iii) Retention of reduced viscosity (R.R.V.).—The reduced viscosity (measured with a solution containing 0.5 g. of polymer in 100 ml. of a mixture consisting of 50 ml. p-chlorophenol and 50 ml. tetrachloroethane as a solvent at 60° C.) of the test bar was measured before and after the heat treatment as above. The retention was calculated as follows:

$$R.R.V.(\%) = \frac{\text{The reduced viscosity of the test bar after heat treatment}}{\text{The reduced viscosity of the test bar before heat treatment}} \times 100$$

TABLE IV

| Stabilizer | Ultimate tensile strength loss, percent | Ultimate elongation loss, percent | Color |
|---|---|---|---|
| Bis-phenol formate derivatives of this invention: | | | |
| (a) 1,1,3-tris (2-methyl-4-formyloxy-5-tert.-butylphenyl) butane | 7 | 4 | Unchanged. |
| (b) 2,2'-dimethyl-4,4'-diformyloxy-5,5'-ditert.-butyldiphenyl sulfide | 15 | 12 | Do. |
| Commercially available stabilizer: | | | |
| (c) 1,1,3-tris (2-methyl-4-hydroxy-5-tert.-dibutylphenyl) butane | 42 | 41 | Yellow-colored. |
| (d) 2,2'-dimethyl-4,4'-dihydroxy-5,5'-di-tert.-dibutyldiphenyl sulfide | 58 | 55 | Do. |
| None | 81 | 77 | Brown-colored. |

(iv) Color.—The color after heat treatment mentioned above was visually observed on each bar.

(v) Thermal stability ($S_{220}$).—The test bar was heated at 220° C. for limited time, for example, 10, 30, 60, and 90 minutes, in silicone oil, thereby formaldehyde gas being evolved with decomposition. The volume of formaldehyde gas thus evolved was measured.

The $S_{220}$ represents the volume (ml.) of formaldehyde gas evolved by using 1 g. of the test bar.

The results are summarized in the following table V.

polymer, of stabilizer specified in the following Table VII and 3.0% by weight, based on the said polymer, of the thermal stabilizer specified in the following Table VII.

The test bar was prepared by repeating the same procedure as in Example 5 and then heated at 220° C. for 30 minutes in an atmosphere. The weight of the test bar was measured before and after the heat treatment as described above, and the weight-retention (W.R.) was calculated in a similar manner to the Example 5. The

TABLE V

| Stabilizer | Light stability, color | W. R., percent | R. R. V., percent | Color | $S_{222}$ (ml./g.) minutes | | | |
|---|---|---|---|---|---|---|---|---|
| | | | | | 10 | 30 | 60 | 90 |
| Bis-phenol formate derivatives of this invention: | | | | | | | | |
| (a) 2,2'-dimethyl-4,4'-diformyloxy-5,5'-di-tert.-butyldiphenyl sulfide | Almost unchanged | 99.10 | 92 | Almost unchanged | 1 | 5 | 15 | 42 |
| (b) 1,1-bis (2-methyl-4-formyloxy-5-tert.-butylphenyl) butane | do | 99.50 | 92 | do | 0 | 3 | 11 | 28 |
| (c) 1,1,3-tris (2-methyl-4-formyloxy-5-tert.-butylphenyl) butane | do | 99.71 | 93 | do | 1 | 5 | 11 | 30 |
| Commercially available stabilizer: | | | | | | | | |
| (d) 2,2'-dimethyl-4,4'-dihydroxy-5,5'-di-tert.-butylphenyl sulfide | Slightly brown colored | 98.70 | 89 | Brittle and slightly yellow-colored | 1 | 7 | 26 | 62 |
| (e) 1,1-bis (2-methyl 4-hydroxy-5-tert.-butylphenyl) butane | Slightly yellow-colored | 98.90 | 92 | Slightly yellow-colored | 1 | 5 | 17 | 48 |
| None | Yellow-colored | 93.40 | 30 | Yellow-colored | 10 | 90 | 190 | |

EXAMPLE 6

Oxymethylene-oxyethylene copolymer containing 2.5% of oxyethylene group, unstable portions of said copolymer color of the test bar after the above heat treatment was also observed in the same method as in Example 5.

The results are summarized in the following Table VII.

| Stabilizer | Thermal stabilizer | W.R., percent | Color |
|---|---|---|---|
| Bis-phenol formate derivatives of this invention: | | | |
| (a) 1,1-bis(2-methyl-4-formyloxy-5-tert.-butylphenyl) butane. | Polyesteramide prepared from 90 parts of ε-caprolactam and 10 parts of ε-caprolactone. | 99.71 | Unchanged. |
| (b) 1,1-bis(2-methyl-4-formyloxy-5-tert.-butylphenyl) butane. | Polyaminotriazole prepared from sebacic hydrazide and azelaic hydrazide. | 99.11 | Almost unchanged. |
| (c) 1,1-bis(2-methyl-4-formyloxy-5-tert.-butylphenyl) butane. | 2-ethylvinylpyridine (30)-methylmethacrylate (70) copolymer. | 99.31 | Do. |
| Commercially available stabilizer: | | | |
| (d) 1,1-bis(2-methyl-4-hydroxy-5-tert.-butylphenyl) butane. | Above polyesteramide | 99.10 | Do. |
| (e) 1,1-bis(2-methyl-4-hydroxy-5-tert.-butylphenyl) butane. | Above polyaminotriazole | 98.78 | Slightly yellow-colored. |
| (f) 1,1-bis(2-methyl-4-hydroxy-5-tert.-butylphenyl) butane. | Above copolymer | 99.01 | Do. | being eliminated by after treatment, was admixed with 1% by weight, based on the above copolymer, of dicyandiamide and 0.5% by weight, based on the above copolymer, of the stabilizer specified in the following Table VI.

The test bar was prepared by repeating the same procedure as in Example 5 and then heated at 220° C. for 60 minutes in an atmosphere. The weight of the test bar was measured before and after the heat treatment as described above, and the weight-retention rate (W.R.) was calculated in a similar manner to the Example 5. The color of test bars after the above heat treatment was also observed in the same method as in Example 5.

The results are summarized in the following Table VI.

What is claimed is:

1. A resinous polymer being a polyolefin, a polyurethane or a polyacetal, wherein said polymer is stabilized against deterioration by light wherein there is incorporated, in a sufficient amount to prevent the deterioration, a compound having the formula:

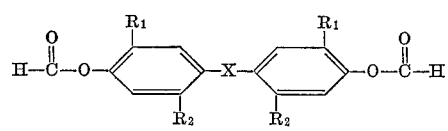

TABLE VI

| Stabilizer | W.R., percent | Color |
|---|---|---|
| Bis-phenol formate derivatives of this invention: | | |
| (a) 2,2'-dimethyl-4,4'-diformyloxy-5,5'-ditert.-butylphenyl sulfide | 98.05 | Unchanged. |
| (b) 1,1-bis(2-methyl-4-formyloxy-5-tert.-butylphenyl)butane | 98.20 | Do. |
| Commercially available stabilizer: | | |
| (c) 2,2'-Dimethyl-4,4'-hydroxy-5,5'-di-tert.-butylphenyl sulfide | 96.12 | Slightly yellow-colored. |
| (d) 1,1-bis(2-methyl-4-hydroxy-5-tert.-butylphenyl)butane | 97.10 | Almost unchanged. |
| None | 93.00 | Yellow-colored. |

EXAMPLE 7

Polyoxymethylene diacetate having a reduced viscosity of 2.21 was admixed 1.0% by weight, based on the said wherein $R_1$ and $R_2$ may be the same or different and represent hydrogen, alkyl or alkoxy group, and X represents oxygen atom, sulfur atom, the group of the formula

wherein $R_3$ and $R_4$ may be the same or different and represent hydrogen atom or alkyl group, or they may form a 3-, 6-, or 7-membered saturated homocyclic ring, or the group of the formula

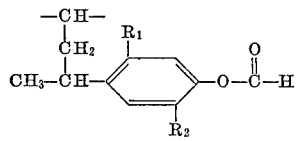

wherein $R_1$ and $R_2$ are as defined above.

2. A resinous polymer as claimed in claim 1, wherein the polymer is high or low pressure polyethylene, polypropylene, polybutadiene, polyisoprene, polystyrene, an ethylene-propylene copolymer, a styrene-butadiene copolymer or an acrylonitrile-butadiene-styrene copolymer.

3. The resinous polymer according to claim 1 wherein the said compound is selected from the group consisting of 2,2' - dimethyl-4,4'-diformyloxy-5,5'-di-tert.-butyldiphenyl sulfide, 1,1 - bis(2 - methyl-4-formyloxy-5-tert.-butylphenyl)butane, 1,1,3 - tris(2 - methyl-4-formyloxy-5-tert.-butylphenyl) methane and 1,1,3 - tris(2 - methyl-4-formyloxy-5-tert.-butylphenyl) butane.

4. The resinous polymer according to claim 1 wherein there is incorporated an amount of 0.01 to 10 percent by weight, based on the resinous polymer, of the compound.

References Cited
UNITED STATES PATENTS
2,985,617 4/1961 Salyer et al. _____ 260—45.7
3,391,111 7/1968 Morgan _____ 260—47

FOREIGN PATENTS
1,006,595 10/1965 Great Britain.

DONALD E. CZAJA, Primary Examiner

V. P. HOKE, Assistant Examiner

U.S. Cl. X.R.

260—2.5, 45.95, 478